(12) United States Patent
Kojima

(10) Patent No.: US 8,022,132 B2
(45) Date of Patent: Sep. 20, 2011

(54) RUBBER COMPOSITION FOR STUDLESS TIRE AND STUDLESS TIRE

(75) Inventor: Ryoji Kojima, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 12/857,714

(22) Filed: Aug. 17, 2010

(65) Prior Publication Data

US 2011/0046291 A1    Feb. 24, 2011

(30) Foreign Application Priority Data

Aug. 18, 2009  (JP) ................. 2009-189398

(51) Int. Cl.
B60C 1/00 (2006.01)
C08K 3/04 (2006.01)
C08K 3/36 (2006.01)

(52) U.S. Cl. .................. 524/526; 524/495; 524/492

(58) Field of Classification Search .................. 524/526, 524/495, 492
See application file for complete search history.

(56) References Cited

U.S. PATENT DOCUMENTS

2006/0116465 A1* 6/2006 Hiza et al. ................ 524/493

FOREIGN PATENT DOCUMENTS

| JP | 06-240052 | * | 8/1994 |
| JP | 6-240052 A | | 8/1994 |
| JP | 9-255813 A | | 9/1997 |
| JP | 2004-196944 A | | 7/2004 |
| JP | 2004-277506 A | | 10/2004 |
| JP | 2005-41924 A | | 2/2005 |
| JP | 2006-56967 A | | 3/2006 |
| JP | 2006-131714 A | | 5/2006 |
| JP | 2006-274051 A | | 10/2006 |
| JP | 2007-277437 A | | 10/2007 |
| JP | 2008-106113 | * | 5/2008 |
| JP | 2008-120937 A | | 5/2008 |
| JP | 2008-127453 A | | 6/2008 |
| JP | 2008-150426 A | | 7/2008 |
| JP | 2008-266498 A | | 11/2008 |
| JP | 4289508 B1 | | 4/2009 |

OTHER PUBLICATIONS

Office Action for corresponding Japanese Application No. 2009-189398 dated May 24, 2011.

* cited by examiner

*Primary Examiner* — Ling-Siu Choi

(74) *Attorney, Agent, or Firm* — Birch, Stewart, Kolasch & Birch, LLP

(57) ABSTRACT

The present invention provides a rubber composition for a studless tire, which can achieve sufficient abrasion resistance, performance on ice and snow, and wet grip performance in a balanced manner, and a studless tire having a tread produced from the above composition. The rubber composition for a studless tire contains a rubber component including natural rubber and butadiene rubber; aromatic oil; silica; and carbon black, wherein the total amount of the natural rubber and the butadiene rubber is 30% by mass or more based on 100% by mass of the rubber component, the amount of the aromatic oil is 12-85 parts by mass and the amount of the silica is 12-85 parts by mass, per 100 parts by mass of the rubber component, and the proportion of the silica is 45% by mass or more based on 100% by mass of the total of the silica and the carbon black.

8 Claims, No Drawings

RUBBER COMPOSITION FOR STUDLESS TIRE AND STUDLESS TIRE

TECHNICAL FIELD

The present invention relates to a rubber composition for a studless tire (a winter tire) and a studless tire.

BACKGROUND ART

Use of spike tires has been banned by law in Japan so as to prevent powder dust pollution resulting from the use of spike tires, and thus studless tires are now used instead of the spike tires in cold regions. Studless tires have been improved in their materials and designs for driving icy or snowy roads having a rougher surface than that of a usual road. For example, a rubber composition has been developed which contains diene rubber having excellent low-temperature properties and contains a softening agent in an increased amount so that a softening effect increases. Here, mineral oil is generally used as the softening agent in order to improve low-temperature properties.

If the amount of mineral oil is increased to improve low-temperature properties, abrasion resistance usually deteriorates. One way of solving such a problem is to change the mineral oil to aromatic oil; however, this way deteriorates low-temperature properties and thus makes it difficult to achieve sufficient performance on ice and snow. In contrast, combination use of aromatic oil and silica allows improvement of low-temperature properties without a decrease in abrasion resistance, but still cannot achieve sufficient levels of these performances. Further, improvement in wet grip performance, as well as performance on ice and snow and abrasion resistance, is also desired.

Patent Document 1, for example, discloses a rubber composition for a tread, which contains ingredients such as natural rubber, butadiene rubber, silica, and aromatic oil. This composition can still be improved in terms of achieving wet grip performance in addition to both abrasion resistance and the performance on ice and snow (low-temperature properties).

Patent Document 1: JP H06-240052 A

SUMMARY OF THE INVENTION

The present invention aims to solve the above problems, and to provide a rubber composition for a studless tire, which can achieve sufficient abrasion resistance, performance on ice and snow, and wet grip performance in a balanced manner. The present invention also aims to provide a studless tire having a tread produced from the above rubber composition.

The present invention relates to a rubber composition for a studless tire, containing: a rubber component including natural rubber and butadiene rubber; aromatic oil; silica; and carbon black, wherein the total amount of the natural rubber and the butadiene rubber is 30% by mass or more based on 100% by mass of the rubber component, the amount of the aromatic oil is 12 to 85 parts by mass and the amount of the silica is 12 to 85 parts by mass, per 100 parts by mass of the rubber component, and the proportion of the silica is 45% by mass or more based on 100% by mass of the total of the silica and the carbon black.

The above rubber composition is preferably used for a tread.

The present invention also relates to a studless tire having a tread produced from the above rubber composition.

The present invention relates to a rubber composition for a studless tire, which contains specific amounts of natural rubber, butadiene rubber, aromatic oil, silica, and carbon black. Use of this rubber composition for a tread leads to provision of a studless tire that achieves excellent abrasion resistance, performance on ice and snow, and wet grip performance in a balanced manner.

BEST MODE FOR CARRYING OUT THE INVENTION

The rubber composition for a studless tire according to the present invention contains a rubber component including natural rubber and butadiene rubber; aromatic oil; silica; and carbon black. Here, the natural rubber and the butadiene rubber are contained in a total amount of equal to or larger than a specific value in the rubber component, and the aromatic oil and the silica are also contained in specific amounts. Further, the proportion of the silica based on the total of the silica and the carbon black is equal to or larger than a specific value. Accordingly, abrasion resistance, performance on ice and snow, and wet grip performance can be improved in a balanced manner.

The rubber composition of the present invention contains both natural rubber and butadiene rubber as the rubber component. This makes it possible to improve low-temperature properties and thus to increase performance on ice and snow. Butadiene rubber, particularly, is an important ingredient for securing the performance on ice.

Examples of the natural rubber (NR) include rubbers generally used in the tire industry, such as SIR20, RSS#3, and TSR20. Examples of the natural rubber (NR) also include modified natural rubbers such as deproteinized natural rubber (DPNR), high-purity natural rubber (HPNR), epoxidized natural rubber (ENR), hydrogenated natural rubber (HNR), and grafted natural rubber. Each of these may be used alone, or two or more of these may be used in combination.

The butadiene rubber (BR) preferably has a cis content of 80% by mass or more. This results in an increase in abrasion resistance. The cis content is more preferably 85% by mass or more, still more preferably 90% by mass or more, and most preferably 95% by mass or more.

Further, the BR preferably has a viscosity of 30 cps or more in the form of a 5% solution in toluene at 25° C. A viscosity of less than 30 cps may greatly deteriorate processability and may also deteriorate abrasion resistance. The viscosity of the BR solution in toluene is preferably 100 cps or less, and more preferably 70 cps or less. A viscosity of more than 100 cps may also deteriorate processability.

Additionally, in consideration of improvement of both processability and abrasion resistance, BR having an Mw/Mn ratio of 3.0 to 3.4 is preferable.

Examples of the BR include, but are not particularly limited to, BRs with a high cis content, such as BR1220 produced by Zeon Corporation, and BR130B and BR150B produced by Ube Industries, Ltd.; and BRs containing a syndiotactic polybutadiene crystal, such as VCR412 and VCR617 produced by Ube Industries, Ltd.

The amount of the NR is preferably 30% by mass or more, more preferably 40% by mass or more, still more preferably 50% by mass or more, and particularly preferably 55% by mass or more, based on 100% by mass of the rubber component. An amount of the NR of less than 30% by mass may greatly decrease tensile strength at break and thus make it difficult to secure abrasion resistance. The amount of the NR is preferably 80% by mass or less, more preferably 70% by mass or less, and still more preferably 65% by mass or less, based on 100% by mass of the rubber component. An amount of the NR of more than 80% by mass may deteriorate low-temperature properties and thus may not be able to secure the performance on ice, which is necessary for a studless tire.

The amount of the BR is preferably 10% by mass or more, more preferably 20% by mass or more, still more preferably 30% by mass or more, and particularly preferably 35% by mass or more, based on 100% by mass of the rubber component. The amount of the BR of 10% by mass or more allows the rubber composition for a studless tire to exert its required performance on ice. The amount of the BR is preferably 80% by mass or less, more preferably 70% by mass or less, and still more preferably 60% by mass or less, based on 100% by mass of the rubber component. An amount of the BR of more than 80% by mass may greatly deteriorate processability and lead to occurrence of whitening due to bleeding of chemical agents.

The total amount of the NR and the BR is 30% by mass or more, preferably 60% by mass or more, more preferably 80% by mass or more, and most preferably 100% by mass, based on 100% by mass of the rubber component. The larger the total amount of the NR and the BR, the better the low-temperature properties, which leads to achievement of the required performance on ice.

The rubber composition may contain other rubbers as long as they do not inhibit the effects of the present invention. Examples of the other rubbers include styrene-butadiene rubber (SBR), isoprene rubber (IR), ethylene-propylene-diene rubber (EPDM), chloroprene rubber (CR), acrylonitrile-butadiene rubber (NBR), butyl rubber (IIR), and hologenated butyl rubber (X-IIR).

The rubber composition of the present invention contains a comparatively large amount of aromatic oil. When mineral oil, which has excellent low-temperature properties, is used, it secures excellent performance on ice and snow but deteriorates abrasion resistance. Here, if the amount of mineral oil is decreased to secure abrasion resistance, the low-temperature properties are deteriorated and therefore performance on ice and snow is decreased; accordingly, conflicting performances of performance on ice and snow and abrasion resistance cannot be achieved at the same time. In contrast, aromatic oil does not greatly decrease abrasion resistance even when the blended amount thereof is large, which can lead to achievement of both the performance on ice and snow and abrasion resistance. Being contained in the rubber composition together with large amounts of silica and carbon black, aromatic oil can contribute to achievement of both the performance on ice and snow and abrasion resistance at a higher level and also contribute to achievement of good wet grip performance.

The aromatic oil of the present invention is, for example, preferably an oil that has an aromatic hydrocarbon content in mass percentage of 15% by mass or more, which content is determined in accordance with ASTM D2140. More specifically, process oil contains aromatic hydrocarbon ($C_A$), paraffinic hydrocarbon ($C_P$), and naphthenic hydrocarbon ($C_N$) in terms of molecular structure. The process oil is roughly regarded as aromatic oil, paraffinic oil, or naphthenic oil, based on the content ratio between $C_A$ (% by mass), $C_P$ (% by mass), and $C_N$ (% by mass). In view of this, the process oil according to the present invention preferably has a $C_A$ content of 15% by mass or more, and more preferably of 17% by mass or more. Also, the aromatic oil of the present invention is preferably an oil having a $C_A$ content of 70% by mass or less, and more preferably of 65% by mass or less.

Examples of commercially available aromatic oil products include AC-12, AC-460, AH-16, AH-24, and AH-58 produced by Idemitsu Kosan Co., Ltd., and process NC300S produced by Japan Energy Corporation.

The amount of the aromatic oil is 12 parts by mass or more, preferably 15 parts by mass or more, more preferably 30 parts by mass or more, particularly preferably 45 parts by mass or more, and most preferably 60 parts by mass or more, per 100 parts by mass of the rubber component. A larger amount of the aromatic oil leads to a better softening effect and better low-temperature properties, which results in improvement in performance on ice and snow. The amount of the aromatic oil is preferably 85 parts by mass or less, and more preferably 80 parts by mass or less, per 100 parts by mass of the rubber component. An amount of the aromatic oil of more than 85 parts by mass may deteriorate properties such as processability, abrasion resistance, and aging resistance.

The rubber composition of the present invention contains a comparatively large amount of silica. The rubber composition containing silica together with aromatic oil can achieve both sufficient abrasion resistance and sufficient performance on ice and snow, and at the same time, can improve wet grip performance which has been considered as a weakness of a studless tire. Examples of the silica include, but are not particularly limited to, silica produced by a wet process and silica produced by a dry process.

The nitrogen adsorption specific surface area ($N_2SA$) of the silica is preferably 80 $m^2/g$ or larger, more preferably 120 $m^2/g$ or larger, and still more preferably 150 $m^2/g$ or larger. An $N_2SA$ of the silica of smaller than 80 $m^2/g$ may greatly deteriorate tensile strength at break and thus make it difficult to secure abrasion resistance. Also, the $N_2SA$ of the silica is preferably 250 $m^2/g$ or smaller, more preferably 220 $m^2/g$ or smaller, and still more preferably 180 $m^2/g$ or smaller. An $N_2SA$ of the silica of larger than 250 $m^2/g$ may greatly increase the viscosity of the rubber composition containing such silica, deteriorating processability.

Here, the $N_2SA$ of the silica is determined by the BET method in accordance with ASTM D3037-81.

The amount of the silica is preferably 12 parts by mass or more, more preferably 15 parts by mass or more, still more preferably 30 parts by mass or more, and particularly preferably 45 parts by mass or more, per 100 parts by mass of the rubber component. Blending of the silica in an amount of 12 parts by mass or more can lead to achievement of sufficient performance on ice and snow, which is necessary for a studless tire. Also, the amount of the silica is preferably 85 parts by mass or less, more preferably 80 parts by mass or less, still more preferably 70 parts by mass or less, and particularly preferably 60 parts by mass or less, per 100 parts by mass of the rubber component. An amount of the silica of more than 85 parts by mass may deteriorate processability and workability, and lead to poor low-temperature properties due to the increase in the filler amount.

The rubber composition preferably contains a silane coupling agent together with silica.

Any silane coupling agent conventionally used with silica in the rubber industries can be used as the silane coupling agent. Examples thereof include sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)

disulfide, bis(3-trimethoxysilylpropyl)disulfide, bis(2-trimethoxysilylethyl)disulfide, and bis(4-trimethoxysilylbutyl)disulfide; mercapto-type silane coupling agents such as 3-mercaptopropyltrimethoxysilane and 3-mercaptopropyltriethoxysilane; vinyl-type silane coupling agents such as vinyltriethoxysilane and vinyltrimethoxysilane; amino-type silane coupling agents such as 3-aminopropyltriethoxysilane and 3-aminopropyltrimethoxysilane; glycidoxy-type silane coupling agents such as γ-glycidoxypropyltriethoxysilane and γ-glycidoxypropyltrimethoxysilane; nitro-type silane coupling agents such as 3-nitropropyltrimethoxysilane; and chloro-type silane coupling agents such as 3-chloropropyltrimethoxysilane. Among these, bis(3-triethoxysilylpropyl) disulfide is preferable which is inexpensive and readily available. Each of these silane coupling agents may be used alone, or two or more of these may be used in combination.

The amount of the silane coupling agent is preferably 2 parts by mass or more, and more preferably 3 parts by mass or more, per 100 parts by mass of the silica. An amount of the silane coupling agent of less than 2 parts by mass may not result in sufficient effect that should be achieved by addition of the silane coupling agent. Also, the amount of the silane coupling agent is preferably 20 parts by mass or less, and more preferably 15 parts by mass or less, per 100 parts by mass of the silica. An amount of the silane coupling agent of more than 20 parts by mass may decrease reinforcement and abrasion resistance.

The rubber composition of the present invention contains carbon black, which provides reinforcement. The rubber composition of the present invention, which further contains NR and BR as well as aromatic oil and silica, can improve abrasion resistance, performance on ice and snow, and wet grip performance in a balanced manner. Examples of the carbon black include, but are not particularly limited to, SAF, ISAF, HAF, FF, and GPF.

The carbon black preferably has an average particle size of 31 nm or smaller and/or a DBP oil absorption of 100 ml/100 g or more. Addition of such carbon black provides the required reinforcement for the rubber composition, can secure block rigidity, uneven-wear resistance, and breaking strength, and leads to achievement of excellent effects of the present invention.

An average particle size of the carbon black of larger than 31 nm may greatly deteriorate tensile strength at break and make it difficult to secure abrasion resistance. The average particle size of the carbon black is more preferably 25 nm or smaller, and still more preferably 23 nm or smaller. Also, the average particle size of the carbon black is preferably 15 nm or larger, and more preferably 19 nm or larger. An average particle size of the carbon black of smaller than 15 nm may greatly increase the viscosity of the rubber composition containing such carbon black, and may deteriorate processability. In the present invention, the average particle size is a number-average particle size, and can be measured with a transmission electron microscope.

A DBP oil absorption (dibutyl phthalate oil absorption) of the carbon black of less than 100 ml/100 g may lead to low reinforcement and make it difficult to secure abrasion resistance. The DBP oil absorption of the carbon black is more preferably 105 ml/100 g or more, and still more preferably 110 ml/100 g or more. Also, the DBP oil absorption of the carbon black is preferably 160 ml/100 g or less, and more preferably 150 ml/100 g or less. An amount of the DBP oil absorption of more than 160 ml/100 g brings difficulties to production of the carbon itself.

The DBP oil absorption of the carbon black can be measured in accordance with the measuring method described in JIS K6217-4.

The nitrogen adsorption specific surface area ($N_2SA$) of the carbon black is preferably 80 $m^2/g$ or larger, and more preferably 110 $m^2/g$ or larger. An $N_2SA$ of smaller than 80 $m^2/g$ may greatly deteriorate tensile strength at break and make it difficult to secure abrasion resistance. Also, the $N_2SA$ of the carbon black is preferably 200 $m^2/g$ or smaller, and more preferably 150 $m^2/g$ or smaller. An $N_2SA$ of larger than 200 $m^2/g$ may greatly increase the viscosity of the rubber composition containing such carbon black, and thus deteriorate processability.

Here, the $N_2SA$ of the carbon black can be determined in accordance with the method A described in JIS K6217.

The amount of the carbon black is preferably 2 parts by mass or more, more preferably 3 parts by mass or more, and still more preferably 5 parts by mass or more, per 100 parts by mass of the rubber component. An amount of the carbon black of less than 2 parts by mass may greatly deteriorate weather resistance and ozone resistance. Also, the amount of the carbon black is preferably 50 parts by mass or less, more preferably 30 parts by mass or less, still more preferably 20 parts by mass or less, and particularly preferably 15 parts by mass or less, per 100 parts by mass of the rubber component. An amount of the carbon black of more than 50 parts by mass may deteriorate low-temperature properties, and therefore may not be able to secure the performance on ice, which is necessary for a studless tire.

The proportion of the silica is 45% by mass or more, preferably 50% by mass or more, and more preferably 55% by mass or more, based on 100% by mass of the total of the silica and the carbon black. A proportion of the silica of less than 45% by mass may not result in the achievement of both performance on ice and abrasion resistance which is an object of the present invention. Also, the proportion of the silica is preferably 95% by mass or less, more preferably 93% by mass or less, and still more preferably 90% by mass or less, based on 100% by mass of the total of the silica and the carbon black. A proportion of the silica of more than 95% by mass may greatly deteriorate weather resistance and ozone resistance.

The rubber composition may optionally contain compounding ingredients generally used in the rubber industries, in addition to the above ingredients. Examples of the compounding ingredients include other fillers, stearic acid, antioxidants, age resistors, zinc oxide, peroxides, vulcanizing agents such as sulfur and sulfur-containing compounds, and vulcanization accelerators.

Preferable vulcanization accelerators are sulfenamide vulcanization accelerators (such as N-tert-butyl-2-benzothiazolyl sulfenamide (TBBS), N-cyclohexyl-2-benzothiazolyl sulfenamide (CBS), N,N-dicyclohexyl-2-benzothiazolyl sulfenamide (DCBS), and N,N-diisopropyl-2-benzothiazole sulfenamide), and guanidine vulcanization accelerators (such as diphenylguanidine (DPG), di-o-tolyguanidine, triphenylguanidine, o-tolylbiguanide, and diphenylguanidine phthalate). Among these, a combination of TBBS and DPG is particularly preferable.

The rubber composition of the present invention can be suitably used for a tread of a studless tire. Further, the rubber composition is applicable to studless tires for vehicles such as trucks and buses and is particularly preferably used for studless tires for passenger vehicles which require high handling stability on ice and snow.

A studless tire can be produced with the rubber composition of the present invention by a usual method. That is, the studless tire can be produced by preparing tire components such as a tread with use of the above rubber composition, assembling the prepared tire components with other components on a tire building machine, and heating the assembled components under pressure.

EXAMPLES

The present invention is more specifically described based on Examples. It is noted that the present invention is not limited to these Examples.

In the following, the respective chemical agents used in Examples and Comparative Examples are listed.

NR: RSS#3
BR: BR150B produced by Ube Industries, Ltd. (cis-1,4 bond content: 97% by mass, $ML_{1+4}$ (100° C.): 40, viscosity of a 5% solution in toluene at 25° C.: 48 cps, Mw/Mn: 3.3)
Carbon black: N220 ($N_2SA$: 120 $m^2/g$, average particle size: 23 nm, DBP oil absorption: 115 ml/100 g) produced by Cabot Japan K.K.
Silica: Ultrasil VN3 ($N_2SA$: 175 $m^2/g$) produced by Degussa AG Silane coupling agent: Si266(bis (3-triethoxysilylpropyl) disulfide) produced by Degussa AG
Mineral oil: PS-32 (paraffinic process oil) produced by Idemitsu Kosan Co., Ltd.
Aromatic oil: Process oil NC300S (aromatic hydrocarbon ($C_A$) content: 29% by mass) produced by Japan Energy Corporation
Stearic acid: Kiri produced by NOF Corporation
Zinc oxide: Zinc oxide #2 produced by Mitsui Mining & Smelting Co., Ltd.
Age resistor: NOCRAC 6C (N-(1, 3-dimethylbutyl)-N'-phenyl-p-phenylenediamine) produced by Ouchi Shinko Chemical Industrial Co., Ltd.
Wax: OZOACE wax produced by Nippon Seiro Co., Ltd.
Sulfur: Sulfur powder produced by Tsurumi Chemical Industry Co., Ltd.
Vulcanization accelerator TBBS: NOCCELER NS (N-tert-butyl-2-benzothiazolyl sulfenamide) produced by Ouchi Shinko Chemical Industrial Co., Ltd.
Vulcanization accelerator DPG: NOCCELER D (N,N'-diphenylguanidine) produced by Ouchi Shinko Chemical Industrial Co., Ltd.

Examples 1 to 4 and Comparative Examples 1 to 6

Chemical agents in amounts according to the formulation amounts shown in Process 1 in Table 1 were mixed and kneaded in a Banbury mixer for five minutes so as to raise the outlet temperature to about 150° C. Thereafter, the sulfur and the vulcanization accelerators in amounts shown in Process 2 were added to the mixture produced through Process 1, and they were mixed and kneaded for three minutes at about 80° C. by an open roll mill, whereby an unvulcanized rubber composition was produced. The produced unvulcanized rubber composition was press-vulcanized for ten minutes at 170° C., so that a vulcanized rubber composition (vulcanized rubber sheet) was produced.

Also, the produced unvulcanized rubber composition was molded into a tread shape and assembled with other tire components. Then, the assembled components were vulcanized for 15 minutes at 170° C., and thereby a test studless tire was produced.

The vulcanized rubber sheets and the test studless tires were evaluated in the following ways.

(1) Hardness

In accordance with JIS K 6253 "Rubber, vulcanized or thermoplastic—Determination of hardness", the hardness of the vulcanized rubber sheets was determined at 0° C. by a type A durometer. The determined values of hardness each are expressed as an index based on the value of Comparative Example 1 being taken as 100.

(2) Glass Transition Temperature (Tg)

A test piece of a predetermined size was cut out from each of the vulcanized rubber sheets. Then, the temperature dependence curve of tan δ (at from −100° C. to 100° C.) of each test piece was determined with a viscoelasticity spectrometer VES produced by Iwamoto Seisakusho Co., Ltd. under the following conditions: an initial strain of 10%; a dynamic strain of 0.5%; a frequency of 10 Hz and an amplitude of ±0.25%; and a temperature increase rate of 2° C./min. From the obtained temperature dependence curve, the tan δ peak temperature was determined, and this temperature was taken as Tg.

(3) Tensile Test

A No. 3 dumbbell-shaped sample punched from each of the vulcanized rubber compositions was subjected to a tensile test in accordance with JIS K6251 "Rubber, vulcanized or thermoplastic—Determination of tensile stress-strain properties", so that the tensile strength at break (TB) of each sample was determined. The larger the value of TB, the higher the strength. The determined values of TB each are expressed as an index based on the value of Comparative Example 1 being taken as 100.

(4) Performance on Ice and Snow

The test studless tires were evaluated for on-vehicle performance on ice and snow under the following conditions. Here, studless tires for passenger vehicles, which have a size of 195/65R15 and a DS-2 pattern, were produced as the studless tires, and the tires were mounted on a 2000 cc FR car made in Japan. The test was run on a test course of Sumitomo Rubber Industries, Ltd. in Nayoro, Hokkaido, Japan. The temperature on ice was from −6° C. to −1° C. and the temperature on snow was from −10° C. to −2° C.

Braking performance (brake stopping distance on ice): The brake stopping distance on ice, which is the distance required for the vehicle to stop after the brakes that lock up are applied at 30 km/h, was measured. Then, with Comparative Example 1 taken as a reference, the braking performance index was calculated from the following formula.

(Braking performance index)=(Brake stopping distance in Comparative Example 1)/(Brake stopping distance of each tire)×100

The larger the index, the better the braking performance.

(5) Wet Grip Performance

With the above test studless tires (having a size of 195/65R15), an actual vehicle running test was performed on a test course with a wet asphalt surface. In the test, grip performance (grip feeling, brake performance, traction performance) was evaluated by feeling. In the evaluation, the performance of tire in Comparative Example 1 was regarded as standard and was graded 100. Then, grading was made in such a manner that the tires were graded 120 if the test driver judged that their performance was obviously improved, and the tires were graded 140 if the test driver judged that their performance was at a high level never seen before.

(6) Abrasion Resistance

The above test studless tires (having a size of 195/65R15) each were mounted on an FF car made in Japan, and the depth of grooves on the tire tread part was measured after the car had run 8000 km. From the measured value, the running distance that makes the depth of the tire grooves decrease by 1 mm was calculated and then the obtained running distance was used in the following formula to calculate the abrasion resistance index.

(Abrasion resistance index)=(Running distance that makes tire groove depth decrease by 1 mm)/(Running distance that makes tire groove depth in Comparative Example 1 decrease by 1 mm)×100

The larger the index, the better the abrasion resistance.
Table 1 shows the evaluation results of the respective tests.

TABLE 1

|  |  |  | Examples | | | | Comparative Examples | | | | | |
| --- | --- | --- | --- | --- | --- | --- | --- | --- | --- | --- | --- | --- |
|  |  |  | 1 | 2 | 3 | 4 | 1 | 2 | 3 | 4 | 5 | 6 |
| Formulation (part(s) by mass) | Process 1 | NR | 60 | 60 | 60 | 60 | 60 | 60 | 60 | 60 | 60 | 60 |
|  |  | BR | 40 | 40 | 40 | 40 | 40 | 40 | 40 | 40 | 40 | 40 |
|  |  | Carbon black | 5 | 5 | 5 | 15 | 20 | 5 | 5 | 30 | 35 | 5 |
|  |  | Silica | 60 | 70 | 80 | 15 | 20 | 60 | 90 | 15 | 5 | 5 |
|  |  | Silane coupling agent | 4.8 | 5.6 | 6.4 | 1.2 | 1.6 | 4.8 | 7.2 | 1.2 | 0.4 | 0.4 |
|  |  | Mineral oil | — | — | — | — | 20 | 60 | — | — | — | — |
|  |  | Aromatic oil | 60 | 70 | 80 | 30 | — | — | 90 | 45 | 40 | 10 |
|  |  | Stearic acid | 2 | 2 | 2 | 2 | 2 | 2 | 2 | 2 | 2 | 2 |
|  |  | Zinc oxide | 3 | 3 | 3 | 3 | 3 | 3 | 3 | 3 | 3 | 3 |
|  |  | Age resistor | 2 | 2 | 2 | 2 | 2 | 2 | 2 | 2 | 2 | 2 |
|  |  | Wax | 2 | 2 | 2 | 2 | 2 | 2 | 2 | 2 | 2 | 2 |
|  | Process 2 | Sulfur | 1.5 | 1.5 | 1.5 | 1.5 | 1.5 | 1.5 | 1.5 | 1.5 | 1.5 | 1.5 |
|  |  | Vulcanization accelerator TBBS | 1.5 | 1.5 | 1.5 | 1.5 | 1.5 | 1.5 | 1.5 | 1.5 | 1.5 | 1.5 |
|  |  | Vulcanization accelerator DPG | 1.0 | 1.0 | 1.0 | 1.0 | 1.0 | 1.0 | 1.0 | 1.0 | 1.0 | 1.0 |
| Evaluation |  | Hardness (0° C.) | 102 | 103 | 104 | 98 | 100 | 99 | 107 | 102 | 106 | 55 |
|  |  | Tg (° C.) | −65 | −66 | −67 | −61 | −60 | −68 | −68 | −61 | −61 | −48 |
|  |  | Tensile strength at break | 115 | 110 | 105 | 101 | 100 | 75 | 90 | 102 | 105 | 60 |
|  |  | Performance on ice and snow | 105 | 102 | 99 | 110 | 100 | 108 | 91 | 95 | 88 | 118 |
|  |  | Wet grip performance | 125 | 130 | 135 | 105 | 100 | 110 | 140 | 101 | 92 | 75 |
|  |  | Abrasion resistance | 120 | 115 | 107 | 103 | 100 | 85 | 89 | 105 | 110 | 45 |

In Examples, the vulcanized rubber sheets and test studless tires showed low Tg, excellent performance on ice and snow, good tensile strength at break, and excellent abrasion resistance. Further, each test studless tire in Examples showed excellent wet grip performance. On the other hand, the test studless tires in Comparative Examples 1 and 2, which contained mineral oil in place of aromatic oil, showed inferior abrasion resistance and wet grip performance. The test studless tire in Comparative Example 3, which contained too large amounts of silica and aromatic oil, showed a decrease in performance on ice and snow and in abrasion resistance.

The test studless tire in Comparative Example 4, which contained silica in a low proportion to the total filler, showed inferior performance on ice and snow and inferior wet grip performance. The test studless tire in Comparative Example 5, which contained a small amount of silica, similarly showed inferior performance on ice and snow and inferior wet grip performance. The test studless tire in Comparative Example 6, which contained small amounts of silica and aromatic oil, showed inferior abrasion resistance and wet grip performance.

The invention claimed is:

1. A studless tire comprising a tread produced from a rubber composition, comprising:
   a rubber component including natural rubber and butadiene rubber;
   aromatic oil;
   silica; and
   carbon black,
   wherein the total amount of the natural rubber and the butadiene rubber is 30% by mass or more based on 100% by mass of the rubber component,
   the amount of the aromatic oil is 12 to 85 parts by mass and the amount of the silica is 12 to 85 parts by mass, per 100 parts by mass of the rubber component, and
   the proportion of the silica is 45% by mass or more based on 100% by mass of the total of the silica and the carbon black.

2. The studless tire according to claim 1,
   wherein the amount of the natural rubber is 30 to 80% by mass and the amount of the butadiene rubber is 10 to 80% by mass, based on 100% by mass of the rubber component.

3. The studless tire according to claim 1,
   wherein the total amount of the natural rubber and the butadiene rubber is 100% by mass based on 100% by mass of the rubber component.

4. The studless tire according to claim 1,
   wherein the amount of the aromatic oil is 45 to 85 parts by mass and the amount of the silica is 45 to 85 parts by mass, per 100 parts by mass of the rubber component.

5. The studless tire according to claim 1,
   wherein the proportion of the silica is 55 to 95% by mass based on 100% by mass of the total of the silica and the carbon black.

6. The studless tire according to claim 1,
   wherein the nitrogen adsorption specific surface area of the silica is 80 to 250 m$^2$ g, and the nitrogen adsorption specific surface area of the carbon black is 80 to 200 m$^2$ g.

7. The studless tire according to claim 1,
   wherein the amount of the carbon black 2 to 50 parts by mass, per 100 parts by mass of the rubber component.

8. The studless tire according to claim 1,
   wherein the aromatic oil has an aromatic hydrocarbon content in mass percentage of 15% by mass or more and 70% by mass or less.

* * * * *